United States Patent
Davies et al.

(10) Patent No.: US 9,151,607 B2
(45) Date of Patent: Oct. 6, 2015

(54) DIMENSIONAL MEASUREMENT THROUGH A COMBINATION OF PHOTOGRAMMETRY AND OPTICAL SCATTERING

(75) Inventors: Angela Devon Davies, Charlotte, NC (US); Brigid Ann Mullany, Charlotte, NC (US); Edward Phillip Morse, Concord, NC (US); Matthew Alan Davies, Charlotte, NC (US)

(73) Assignee: UNIVERSITY OF NORTH CAROLINA AT CHARLOTTE, Charlotte, NC (US)

( * ) Notice: Subject to any disclaimer, the term of this patent is extended or adjusted under 35 U.S.C. 154(b) by 629 days.

(21) Appl. No.: 13/118,969

(22) Filed: May 31, 2011

(65) Prior Publication Data
US 2012/0050528 A1    Mar. 1, 2012

Related U.S. Application Data

(60) Provisional application No. 61/349,923, filed on May 31, 2010.

(51) Int. Cl.
| | |
|---|---|
| *H04N 9/47* | (2006.01) |
| *H04N 7/18* | (2006.01) |
| *G01C 11/02* | (2006.01) |
| *G01S 7/497* | (2006.01) |
| *G01S 17/89* | (2006.01) |

(52) U.S. Cl.
CPC ............... *G01C 11/02* (2013.01); *G01S 7/497* (2013.01); *G01S 17/89* (2013.01)

(58) Field of Classification Search
CPC ............................... G01S 17/023; G01S 17/36
USPC ........................................................ 348/136
See application file for complete search history.

(56) References Cited

U.S. PATENT DOCUMENTS

| | | | | |
|---|---|---|---|---|
| 5,216,476 | A * | 6/1993 | Lanckton | 356/2 |
| 2002/0033885 | A1* | 3/2002 | Schuler et al. | 348/207 |
| 2003/0227615 | A1* | 12/2003 | Montgomery et al. | 356/139.03 |
| 2008/0239316 | A1* | 10/2008 | Gharib et al. | 356/364 |

OTHER PUBLICATIONS

Marc Erich Latoschik, Elmar Bomberg, "Augmenting a Laser Pointer with a Diffraction Grating for Monoscopic 6DOF Detection," Journal of Virtual Reality and Broadcasting, (vol. 4) (2006), (Issue. 14).

(Continued)

*Primary Examiner* — Chikaodili E Anyikire
(74) *Attorney, Agent, or Firm* — Erickson Kernell Derusseau & Kleypas, LLC

(57) ABSTRACT

A system for determining the position and location of a module comprising: a module which includes an optical generator which generates an optical beam; a diffractive element placed in the path of the optical beam which generates an optical pattern; a reference length artifact placed in a location with close proximity to the optical pattern; and a plurality of digital cameras connected to a computer with photogrammetry software and a minimization algorithm installed on the computer; where the digital cameras are set up in different locations to take one or more digital images of the optical pattern, with at least one digital image including the reference length artifact; and where the digital images are downloaded onto the computer and processed by the photogrammetry software to generate optical coordinate data followed by the insertion of the optical coordinate data into the minimization algorithm to generate the position and location of the module.

20 Claims, 10 Drawing Sheets

(56) References Cited

OTHER PUBLICATIONS

Richard M. Marino, et al., "A compact 3D imaging laser radar system using Geiger-mode APD arrays: system and measurements," Laser Radar Technology and Applications VIII, Proceedings of SPIE, (vol. 5086), (p. 1-15), (2003).

Weimin Li, et al., "Method of rotation angle measurement in machine vision based on calibration pattern with spot array," Applied Optics, Optical Society of America, (vol. 49), (Issue. 6), (p. 1001-1006), (Feb. 20, 2010).

* cited by examiner

DIMENSIONAL MEASUREMENT THROUGH A COMBINATION OF PHOTOGRAMMETRY AND OPTICAL SCATTERING

RELATED CASES

This application claims the priority of the provisional application Ser. No. 61/349,923 filed May 31, 2010. Applicant hereby incorporates by reference the entire content of provisional application Ser. No. 61/349,923.

GOVERNMENT SUPPORT

This invention was made with Government support under award number 0928364 by the National Science Foundation. The United States Government has certain rights in the invention.

FIELD OF THE INVENTION

This invention relates to a system and method for determining the location and orientation of an object using both optical scattering and photogrammetry.

BACKGROUND OF THE INVENTION

Photogrammetry extracts data from two-dimensional images and maps them into a three-dimensional space, reconstructing the object being imaged. Put another way, photogrammetry is the technique of obtaining precise geometrical measurements and three-dimensional data of an object from two or more two-dimensional photographs of that object. Photogrammatic processing is based on the principle of triangulation, whereby intersecting lines in space are used to compute the location of a point in all three dimensions. Long-range photogrammetry was first used to survey buildings in 1849 and over the course of the latter part of the 19th century, evolved into aerial photogrammetry by the early 1900's. Aerial photogrammetry, which typically refers to oblique or vertical images acquired from distances that are greater than 300 meters, is used to measure the geometry of objects in specializations such as forestry, archeology, cartography, geology and urban planning. Close-range photogrammetry, which has an object-to-camera distance of less than 300 meters, has been used in manufacturing, the analysis of ancient artifacts, traffic accidents and in plastic surgery applications.

Optical projection, reflection or scattering is a process whereby a form of electromagnetic radiation, such as visible light, infrared light, or gamma rays, is forced to deviate from a rectilinear trajectory to an alternate trajectory by one or more non-uniformities within the medium through which they pass or from non-uniformities on a surface from which they reflect and/or scatter from a surface. In the past, optical projection has been used in combination with photogrammetry, but only in the limited role of placing optical targets onto an object which is to be measured. This is a substantially different role than the one disclosed herein. Hence, there is a strong need to develop a system which is capable of determining the location of a module or surface geometry of a part by using photogrammetry to determine the locations in space of optical beams themselves as they are projected from a module or reflect from a part which does not require physical contact or visualization of the module or part.

SUMMARY OF THE INVENTION

A system for determining the position and location of a module comprising: a module which includes an optical generator which generates an optical beam; a diffractive element placed in the path of the optical beam which generates an optical pattern; a reference length artifact placed in a location with close proximity to the optical pattern; and a plurality of digital cameras connected to a computer with photogrammetry software and a minimization algorithm installed on the computer; where the digital cameras are set up in different locations to take one or more digital images of the optical pattern, with at least one digital image including the reference length artifact; and where the digital images are downloaded onto the computer and processed by the photogrammetry software to generate optical coordinate data followed by the insertion of the optical coordinate data into the minimization algorithm to generate the position and location of the module.

DETAILED DESCRIPTION

The present invention now will be described more fully hereinafter in the following detailed description of the invention, in which some, but not all embodiments of the invention are described. This invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. The term "and/or", as used herein, includes any and all combinations of one or more of the associated listed items. The singular forms "a," "an," and "the", as used herein, are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention combines the disciplines of photogrammetry and remote sensing to realize a new dimensional measurement capability in manufacturing engineering that is inexpensive, non-contact, remote, and applicable to in situ measurements. Effectively we will be moving the part measurement out away from the part by using photogrammetry to measure the optical scattering from the part.

Figure 6:
FIG. 6 illustrates one embodiment of a reference length artifact according to the present invention.
Figure 7:
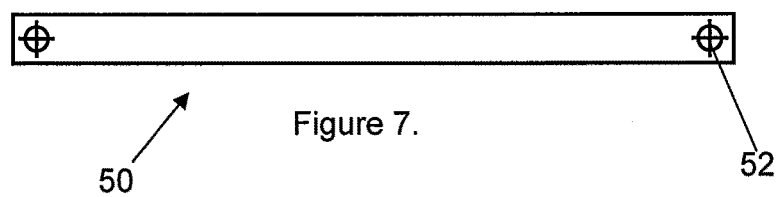
FIG. 7 illustrates one embodiment of a reference length artifact according to the present invention.

Looking to FIGS. 1 through 5 we see that the instant invention includes a system 5 for determining the position and location of a module 10 comprising: a module 10 which includes an optical generator 12 which generates an optical beam 14 (See FIGS. 1 and 3); a diffractive element 20 placed in the path of the optical beam 14 which generates an optical pattern 30 (FIG. 4); a reference length artifact 50 (FIGS. 6 and 7) is placed in a location with close proximity to the optical pattern 30; and a plurality of digital cameras 60 (See FIGS. 2 and 5) connected to a computer 70 with photogrammetry software and a minimization algorithm installed on the computer 70; where the digital cameras 60 are set up in different locations to take one or more digital images 65 of the optical pattern 30, with at least one digital image 65 including the reference length artifact 50; and where the digital images 65 are downloaded onto the computer 70 and processed by the photogrammetry software to generate optical coordinate data followed by the insertion of the optical coordinate data into the minimization algorithm to generate the position and location of the module 10.

Figure 1:
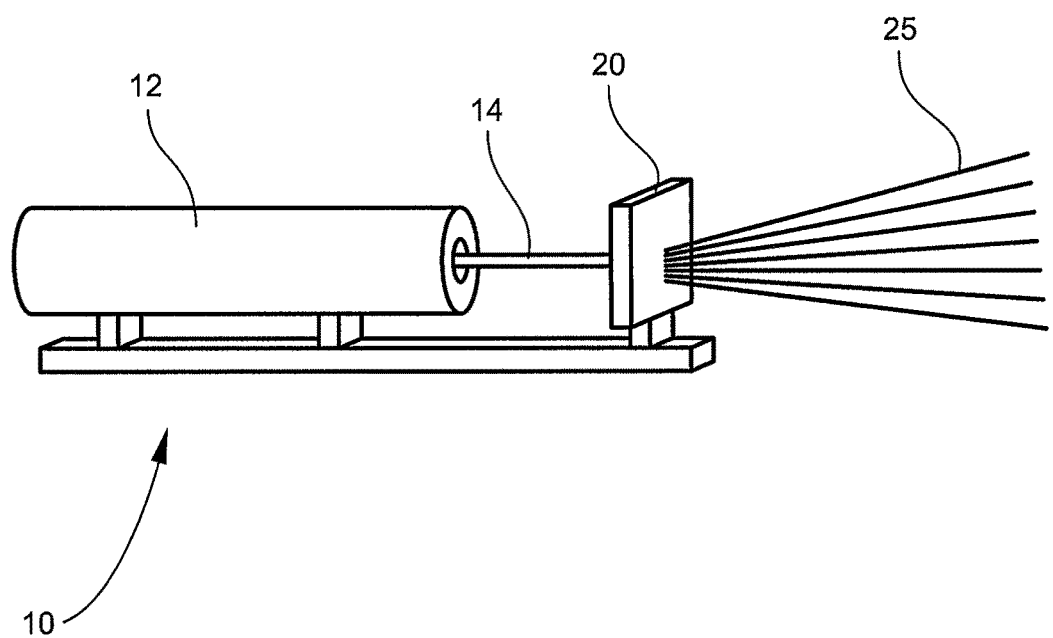
FIG. 1 illustrates one embodiment of a module according to the present invention.
Figure 2:
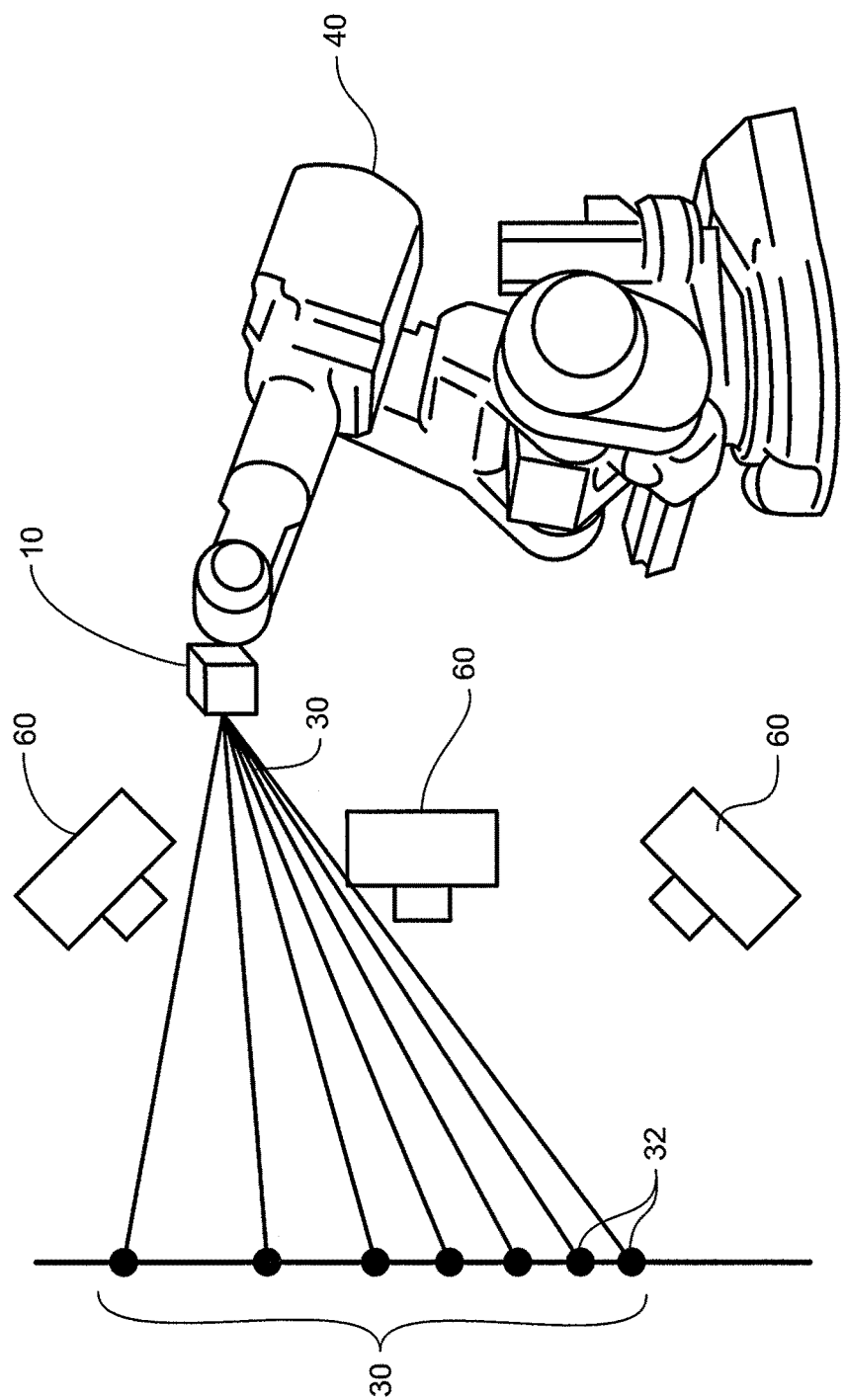
FIG. 2 illustrates one embodiment of a system for determining the position and location of a module according to the present invention.

FIG. 2 shows the basic schematic of the photogrammetry measurement. A module 10 mounted to the arm of a robot 40 generates an optical pattern 30 that can be observed on the wall and photogrammetry is carried out on the observed optical pattern 30 to determine the angle and position of the module 10. By using this system and method, the motion of the robot arm 40 can be monitored in real time. This indirect photogrammatic measurement technique offers several advantages. First, the projected optical pattern 30 can provide a very large number of easily identifiable points 32 for the photogrammetry measurement, which effectively provides an improvement over direct photogrammetry through averaging. Also, by using the measurement of the projected optical pattern 30 we are effectively moving the object measurement out away from the object 40, and this allows position measurements during manufacturing processes where traditional sensor measurements are not possible.

Additionally, the system 5 and method are very inexpensive and have a large measurement range with low measurement uncertainty (a large dynamic range). Multi-megapixel digital cameras 60 are now inexpensive, and commercial photogrammetry packages can be purchased for a few thousand dollars. Digital cameras 60 can be mounted or positioned anywhere and provide digital images 65 of the entire environment (e.g. room walls, ceiling, floor, etc.) with significant overlap and coverage, thus a photogrammetry measurement can be made of the optical pattern 30 as long as it is captured by a subset of the digital cameras 60. This means the system 5 and method can measure very large translations and rotations with the same measurement uncertainty. There are potential applications to hostile environments, for example with extreme temperatures or radiation levels like ovens or power plants. The measurement is possible as long as windows exist to allow sufficient visibility for several camera 60 orientations.

Position and location, as used in the current application, refer to the six degrees of freedom that exist for an object in any three-dimensional space. The six degrees of freedom refer to the motion of a rigid body in three-dimensional space, namely the ability to move forward/backward, up/down, left/right (translation along the three perpendicular axes) combined with rotation about the three perpendicular axes (pitch, yaw, roll). As the movement along each of the three axes is independent of each other and independent of the rotation about any of these axes, the motion demonstrates six degrees of freedom. Three of the degrees of freedom refer to translations which are linear in nature. More specifically, the three translations refer to linear movement in the x-direction, linear movement in the y-direction, and linear movement in the z-direction. The remaining three degrees of freedom refer to rotations around an axis, namely rotation around the x-axis, rotation around the y-axis, and rotation around the z-axis. In the current invention, the position and/or location that is determined may refer to either the position and/or location of a module 10, the position and/or location of an object 40, or the position and/or location of both a module 10 and an object 40.

Module 10, as used in the current application, refers to a device which includes an optical generator 12 and a diffractive element 20. Looking to FIGS. 1 and 3, we see one embodiment of a module 10 which includes an optical generator 12, an optical beam 14, a diffractive element 20, optical pattern beams 25 and an optical pattern 30. The optical generator 12 is capable of generating an optical beam 14 and the diffractive element 20 is placed in the path of the optical beam 14 in order to generate optical pattern beams 25 and an optical pattern 30. The optical generator 12 is capable of generating an optical beam 14 which is comprised of light selected from the group comprising: visible light, ultraviolet light, infrared light, or a combination thereof. In one embodiment of the present invention, the optical generator 12 is a laser.

Optical beam 14, as used in the current application, refers to a projection of light energy radiating from an optical generator 12 into a beam of light. In one embodiment of the present invention, the optical beam 14 generated may be selected from the group comprising: visible light, ultraviolet light, infrared light, or a combination thereof. In another embodiment of the present invention, an optical beam 14 having a minimal amount of beam divergence is used. In yet another embodiment, a laser is used to generate an optical beam 14.

Diffraction, as used in the current application, refers to various phenomena which occur when a light wave encounters an obstacle. Diffractive element 20, as used in the current application, refers to the element which includes an obstacle that will affect a light wave when the light wave encounters that obstacle. A diffractive element 20 is an optical component with a periodic structure which splits and diffracts light into a plurality of optical pattern beams 25 travelling in different directions. The directions of the optical pattern beams 25 depend on the spacing of the element and the wavelength of the light so that the element causes the light wave to change direction. In one embodiment of the present invention, a diffractive element 20 is placed in the path of an optical beam 14 in order to generate optical pattern beams 25 and an optical pattern 30.

Optical pattern 30, as used in the current application, refers to a pattern generated when an optical beam 14 travels through a diffractive element 20 generating optical pattern beams 25. Put another way, an optical pattern 30 is the pattern of the optical pattern beams 25 when they intersect a surface in the environment (e.g. a room, a building, outdoors, etc.). The optical pattern 30 provides a plurality of coordinates for the photogrammetry measurement. Generally speaking, the greater the number of coordinates for the photogrammetry measurement, the more accurate the measurement results will be. The optical pattern 30 generated can take any shape and be any size. In one embodiment of the present invention, the optical pattern 30 generated may be greater than twenty-five square meters and less than fifty square meters. In one embodiment of the present invention, the optical pattern is a visible optical pattern. In another embodiment, the optical pattern 30 generated may be greater than fifteen square meters and less than twenty-five square meters. In still another embodiment, the optical pattern 30 generated may be greater than ten square meters and less than fifteen square meters. In yet another embodiment, the optical pattern 30 generated may be greater than five square meters and less than ten square meters. In still another embodiment, the optical pattern 30 generated may be greater than two square meters and less than five square meters. In yet another embodiment, the optical pattern 30 generated may be greater than one square millimeter and less than two square meters. In one embodiment of the present invention, the optical pattern 30 generated may be selected from the group comprising: a square, a circle, a triangle, a rectangle, a parallelogram, a diamond, an oval, or a combination thereof. An optical pattern 30 can be comprised of a variety of objects selected from the group comprising: dots, lines, or a combination thereof. An optical pattern 30 could also contain light 'spots' that take on a specific shape (like the coded targets often used in photogrammetry, circles with a missing section, circles around dots, or the like). Diffractive elements 20 can be made that will project an optical pattern 30 into virtually any shape or combination of shapes which include, but are not limited to, a person's face, a keyboard, a logo, or the like. Using elaborate optical patterns in the instant invention would greatly facilitate automation where points could be quickly and easily found through automated image processing for photogrammetry. In one embodiment of the present invention, an optical pattern 30 is comprised of a plurality of dots. In another embodiment of the present invention, an optical pattern 30 is comprised of four or more dots. In another embodiment of the present invention, an optical pattern 30 is comprised of thirteen or more dots. In still another embodiment, an optical pattern is comprised of 49 dots, in a seven by seven dot matrix pattern which is square shaped. In yet another embodiment, the optical pattern may be observed on a flat surface selected from the group comprising: a wall, a floor, a ceiling, a column, a door, or a combination thereof. In still another embodiment, the optical pattern may be observed on a non-flat surface.

Optical patterns 30 generated by a diffractive element 20 spread out and get larger as the source of the optical pattern 30 is moved further away from the screen/wall. The angle spread of the optical pattern 30 is constant, causing the size to get bigger as the screen/wall is moved further away. The angle spread depends on the size-scale of the small structure in the diffractive element 20 that causes the diffraction (optical beam 14 redirection) and the wavelength of the light going through the element. Diffractive elements can also be reflective—that is the optical pattern 30 is observed in the reflected direction of an optical beam 14, rather than transmitting through it. In one embodiment of the present invention, the shape and size of the optical pattern 30 generated is determined by the angles of the optical pattern beams 25 which result when an optical beam 14 passes through a diffractive element 20. The angles between optical pattern beams 25 may be measured by any known means. Looking to FIGS. 3 and 4, the angles between optical pattern beams 25 may refer to horizontal angle 34 measurements between beams, vertical angle 36 measurements between beams, diagonal angle 38 measurements between beams, or a combination thereof. In one embodiment of the present invention, the angles between optical pattern beams is in the range of 0.01 to 60 degrees. In another embodiment, the angles between optical pattern beams is in the range of 0.01 to 45 degrees. In still another embodiment, the angles between optical pattern beams is in the range of 0.01 to 30 degrees. In yet another embodiment, the angles between optical pattern beams is in the range of 0.01 to 20 degrees. In still another embodiment, the angles between optical pattern beams is in the range of 0.01 to 15 degrees. In yet another embodiment, the angles between optical pattern beams is in the range of 0.01 to 10 degrees. In still another embodiment, the angles between optical pattern beams is in the range of 0.01 to 7 degrees. In yet another embodiment, the angles between optical pattern beams is in the range of 0.01 to 5 degrees. In still another embodiment, the angles between optical pattern beams is in the range of 0.01 to 3 degrees. In another embodiment, the angles between optical pattern beams is in the range of 0.01 to 2 degrees. In one embodiment of the present invention, the wavelength of the light is in the range of 10 nm to 1 mm. In still another embodiment, the wavelength of the light is in the range of 10 nm to 100 nm. In yet another embodiment, the wavelength of the light is in the range of 100 nm to 100 μm. In still another embodiment, the wavelength of the light is in the range of 100 μm to 1 mm.

Figure 5:
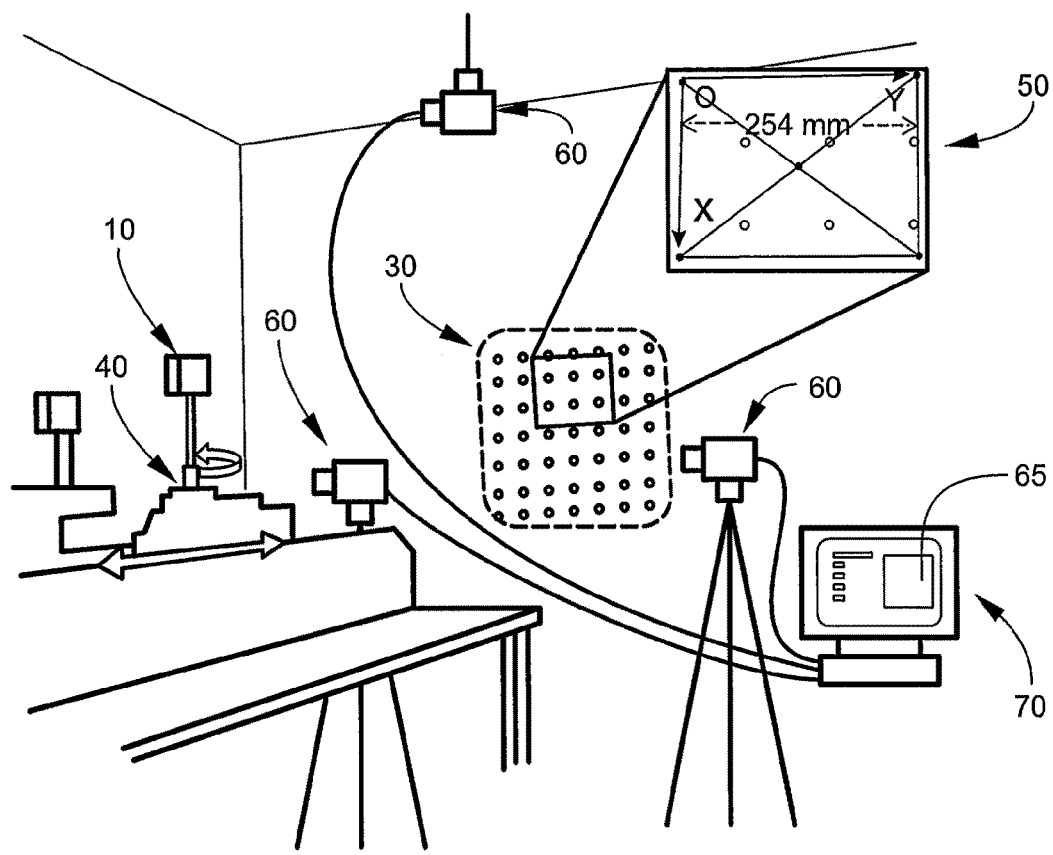
FIG. 5 illustrates one embodiment of a system for determining the position and location of a module according to the present invention.
Figure 8:
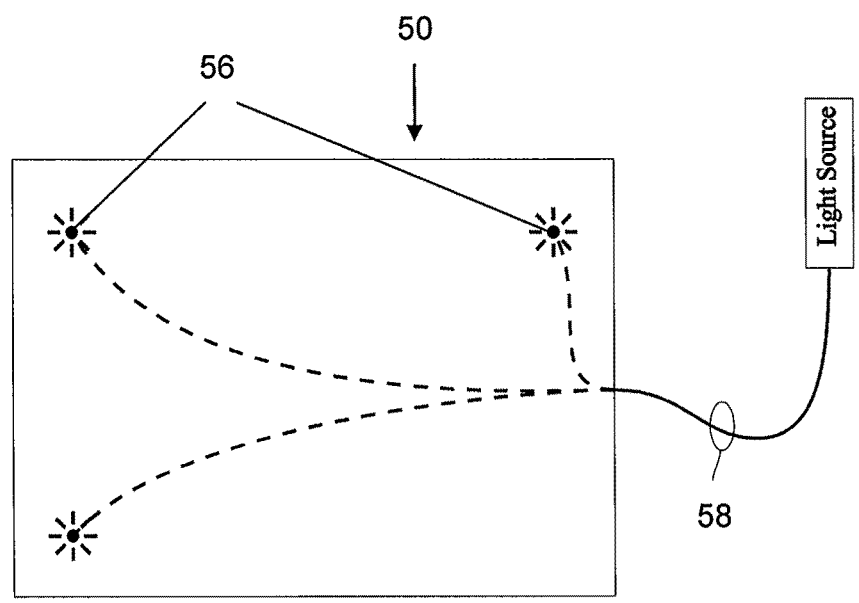
FIG. 8 illustrates one embodiment of a reference length artifact according to the present invention.

Reference length artifact 50, as used in the current application, refers to a device having a known length. A reference length artifact 50 must be placed in a location with close proximity to the optical pattern 30. In one embodiment of the present invention, a reference length artifact 50 refers to a device which provides a known length and a global coordinate system, as illustrated in FIG. 5. In another embodiment, the reference length artifact 50 is made from rods or bars with high contrast painted markings, or reflective targets at a calibrated distance, see FIGS. 6 and 7. In one embodiment of the present invention, the reference length artifacts 50 are self-illuminated. In another embodiment, the reference length artifacts 50 will consist of plates of different sizes (a circular plate (52) 100 mm in diameter, and a rectangular plate (54) 200 mm×800 mm, for example) that have mounting holes 56 for a multi-mode fiber carrier 58 (FIG. 8). The mounting holes 56 may be measured precisely using a coordinate measuring machine, and the fiber carriers 58 have very low uncertainty in locating the fiber relative to the carrier. In this way, we provide a series of illuminated points 32 that can be used to create reference distances for the photogrammetry software. These reference distances will not require external illumination (camera flash) as they will be illuminated by a separate source.

Digital camera 60, as used in the current application, refers to a camera that takes still photographs, video, or both, digitally by recording images using an electronic image sensor. A digital image 65, as used in the current application, refers to a numeric representation of a two-dimensional image. Put another way, a digital image 65 may refer to raster images also called bitmap images. Raster images are comprised of a finite set of digital values called pixels. A digital image 65 contains a fixed number of rows and columns of pixels which are the smallest individual element in an image. Generally, the greater the number of pixels the finer the resolution of the image and the better the quality of the image. In one embodiment of the present invention, a plurality of digital cameras 60 are connected to a computer 70, with each digital camera 60 being set up in a different location to take one or more digital images 65 of an optical pattern 30 simultaneously, with at least one digital image 65 including a reference length artifact 50. In another embodiment, a plurality of digital cameras 60 are connected to a computer 70 with photogrammetry software installed on the computer 70, with each digital camera 60 being set up in a different location to take one or more digital image 65 of an optical pattern 30 simultaneously, with at least one digital image 65 including a reference length artifact 50, where the digital images 65 are downloaded onto the computer 70 and processed by the photogrammetry software to generate optical coordinate data. In still another embodiment, a plurality of digital cameras 60 are connected to a computer 70 with photogrammetry software and a minimization algorithm installed on the computer 70, with each digital camera 60 being set up in a different location to take one or more digital images 65 of an optical pattern 30 simultaneously, with at least one digital image 65 including a reference length artifact 50, where the digital images 65 are downloaded onto the computer 70 and processed by the photogrammetry software to generate optical coordinate data followed by the insertion of the optical coordinate data into the minimization algorithm to generate the position and location of the module 10 and/or object 40. In one embodiment of the present invention, two or more digital cameras 60 are used to simultaneously capture digital images 65 of the optical pattern 30. In another embodiment, three or more digital cameras 60 are used to simultaneously capture digital images 65 of the optical pattern 30. In yet another embodiment, two or more digital cameras 60 are used to simultaneously capture digital images 65 of an optical pattern 30 and each digital camera 60 possess a pixel count of at least three million (three megapixels). In still another embodiment, three or more digital cameras 60 are used to simultaneously capture digital images 65 of an optical pattern 30 and each digital camera 65 possess a pixel count of at least three million (three megapixels).

In one embodiment of the present invention, a traditional film camera may be used in place of a digital camera and a photographic image is taken which is then scanned into a computer and analyzed by the photogrammetry software in order to generate optical coordinate data. In another embodiment, a traditional film camera may be used in conjunction with one or more digital cameras, one or more virtual digital cameras, or a combination thereof.

Virtual digital camera, as used in the current application, refers to a model for the module 10 whereby the module itself mathematically functions like a camera in the same way the actual digital cameras 60 do for the photogrammetric analysis. In this model, the location where the optical beam 14 passes through the diffractive element 20 is taken to be the principal point of a camera and the line of the optical beam 14 is taken to be the optical axis of the virtual digital camera. A plane is mathematically defined behind the principal point (on the same side as the incident optical beam) that is perpendicular to the optical axis. A virtual array of pixels is defined on this plane, for example using the array size (often called the format size) and number of pixels of the actual cameras used in the measurement. The focal length and format size are chosen to be consistent with the angular spread of the diffractive pattern leaving the diffractive element (this defines the field of view). The combination of the virtual focal length and virtual format size will be consistent with the full angular spread of the optical pattern 30, the possible sizes of which are described elsewhere. For example, one could use a focal length and format size comparable to those of the actual digital cameras 60. The actual optical pattern beams 25 leaving the diffractive element, with their known angular separation, are then propagated backward through the principle point of this virtual digital camera to intersect at the detect array of the virtual digital camera. A virtual digital image is then mathematically generated to correspond to bright spots in the image at the intersection pixels. This virtual digital image is used as an input to the photogrammetry software as are the actual digital images 65. The bundle adjustment returns the position and orientation of all digital cameras and optical patterns, and will thus solve for the position and orientation of the virtual digital camera which is the module 10.

Detector array/detector plane, as used in the current application, refers to the array of pixels on the plane behind the principal point of the virtual camera model of the module. The intersection of the optical pattern beams with the detector array defines the simulated photograph for the module as a virtual camera.

In one embodiment of the present invention, camera specifications for the virtual digital camera are defined, such as focal length, detector array size, and number of pixels. The detector array size is the format size for the virtual camera. The format size is the total size of the region on the plane behind the virtual camera's principal point that represents the total pixel array used to generate the virtual photograph. The total pixel array must be large enough to encompass the full angular spread of the optical pattern, as projected back from the principle point. The ratio of one half of the format size to the focal length should be larger than or equal to the tangent of the half-angle of the full angle of the optical pattern. Any format size and focal length combination that is consistent with this definition is acceptable. Ideally the format size is only slightly larger than needed to capture the full optical pattern. In another embodiment of the present invention, the specifications, such as focal length, detector array size, and number of pixels, for the virtual digital camera are identical to the specifications for the digital cameras 60.

Virtual digital image, as used in the current application, refers to an image or images which are simulated for the virtual digital camera by extrapolating the optical pattern beams 25 back through the principal point, that is to say, the diffractive element 20, to a detector plane. The virtual digital image is generated by noting the pixels in the detector plane that coincide with the intersection of the extrapolated optical pattern beams with the detector plane. The detector array is mathematically represented by an array of numbers, each number corresponding to a single pixel, and the intersection pixels are given a large value and the remaining pixels are given a value of zero. The distinction between the large numbers and zero indicates whether the spot is bright or black in the image. This array is then used to generate a digital image using MATLAB, for example. Additional information can be added to the file so as to be consistent with a typical digital image downloaded from an actual camera.

Photogrammetry software, as used in the current application, refers to computer software which can process and analyze one or more digital images 65 to make a photogrammetry measurement of an optical pattern 30 generated by a module 10. However, in the instant invention, photogrammetry is not carried out on the module 10 itself, but is instead carried out on the optical pattern 30 generated by that module 10. The technique of photogrammetry extracts data from two-dimensional images and maps them into a three-dimensional space, reconstructing the location of the object 40 being imaged. Photogrammetric processing is based on the principle of triangulation, whereby intersecting lines in space are used to compute the location of a point in all three dimensions. Using the method described in the present application, photogrammetry is used in an unconventional way to trace the motion of a module 10. As stated previously, photogrammetry is not used to measure the location of the module 10 directly, rather photogrammetry is used to measure an optical pattern 30 generated by the module 10. Theoretically the optical pattern 30 generated by the module 10 can be anything, although photogrammetry will work best if the pattern has well-defined features where the feature centers can be easily identified from digital images 65. So long as the relationship between the optical pattern 30 and the module location is known (e.g. the angle between optical pattern beams 25 is known), the location and orientation of the module 10 can be determined. Examples of photogrammetry software include, but are not limited to, PhotoModeler® (Eos Systems Inc., Vancouver, BC), iWitness (DCS, Inc., Bellevue, Wash.), V-STARS (Geodetic Systems Inc., Melbourne, Fla.) and ImageMaster (Topcon, United Kingdom).

Minimization algorithm, as used in the current application, refers to the means by which the location and orientation of the module is calculated from (1) the locations of the points 32 in the optical pattern 30 and (2) knowledge of the properties of the diffractive element 20 for the optical generator 12. In one embodiment of the present invention, the minimization algorithm is a chi-square minimization algorithm operating in a MATLAB environment. In another embodiment of the present invention, the location of a module 10 can be calculated by the photogrammetry software in the "bundle adjustment" minimization step. This is accomplished by simulating photographic images of the optical pattern as would be seen from the location and orientation of the module.

Optical coordinate data, as used in the current application, refers to the coordinates of the points (32 in FIG. 3) in the optical pattern 30. More specifically, these are the points 32 where the individual beams in the pattern intersect a surface in the environment, such as a wall or other object. The optical coordinate data is generated by the photogrammetry software after it has processed the digital images 65 of the optical pattern 30 and the reference length artifact 50 taken by the plurality of digital cameras 60.

In one embodiment, the above system further includes one or more additional modules which include an additional optical generator which generates an additional optical beam and an additional diffractive element placed in the path of said additional optical beam which generates an additional optical pattern. The additional optical generator(s) may emit a different type of optical beam (visual, infrared, ultraviolet) or a different color of optic beam to allow for the tracking of multiple modules and/or objects. The additional optical generator(s) may project a different kind of pattern to allow for the tracking of multiple modules and/or objects. In another embodiment, multiple optical beam colors are sent through the same diffractive element 20, thereby increasing the number of points by a factor of the number of wavelengths (colors) used. Each color will send out beams at different angles, so they could each generate a distinct pattern with a different angular spacing. Color filtering in the image analysis can assist in identifying the same dots in each photograph.

One embodiment of the current invention discloses a system 5 for determining the position and location of a module 10 comprising: a module 10 which includes an optical generator 12 which generates an optical beam 14 and a diffractive element 20 placed in the path of the optical beam 14 which generates optical pattern beams 25 and an optical pattern 30; a reference length artifact 50 placed in a location with close proximity to the optical pattern 30; and a plurality of digital cameras 60 connected to a computer 70 with photogrammetry software and a minimization algorithm installed on the computer 70; where the digital cameras 60 are set up in different locations to take one or more digital images 65 of the optical pattern 30, with at least one digital image 65 including the reference length artifact 50; wherein the module is also a virtual digital camera having a principal point which coincides with the point where the optical pattern beams 25 leave the diffractive element 20; where a virtual digital image is simulated for the virtual digital camera by extrapolating the optical pattern beams 25 back through the principal point, that is to say, the diffractive element 20, to a detector plane; and where the digital images 65 and the simulated digital image are downloaded onto the computer 70 and processed by the photogrammetry software to generate optical coordinate data as well as the locations and orientations of each digital camera 60 and virtual digital camera (module 10) used in the system. In one embodiment of the above system, one digital camera 60 and one virtual digital camera are used to provide digital images 65 and virtual digital images which are downloaded onto a computer 70 and processed by the photogrammetry software to generate optical coordinate data as well as the locations and orientations of each digital camera 60 and virtual digital camera (module 10) used in the system. In another embodiment of the above system, two or more digital cameras 60 and one or more virtual digital cameras are used to provide digital images 65 and virtual digital images which are downloaded onto a computer 70 and processed by the photogrammetry software to generate optical coordinate data as well as the locations and orientations of each digital camera 60 and virtual digital camera (module 10) used in the system.

The present invention also includes a method for determining the position and location of a module comprising the following steps: attaching a module to an object, the module includes an optical generator which generates an optical beam followed by providing a diffractive element placed in the path of the optical beam which generates optical pattern beams and an optical pattern on one or more surfaces. A reference length artifact is placed in a location with a close proximity of the optical pattern. The module is then activated in order to generate an optical pattern on one or more surfaces followed by generating one or more digital images of the optical pattern with a plurality of digital cameras connected to a computer having photogrammetry software and a minimization algorithm installed on the computer. The digital cameras are set up in different locations to take one or more digital image of the optical pattern simultaneously, with at least one image including the reference length artifact. The digital images are then downloaded onto the computer where they are then processed by the photogrammetry software to generate optical coordinate data. The optical coordinate data is then inserted into the minimization algorithm to generate the position and location of the module.

In one embodiment of the above method, the optical generator is capable of generating light selected from the group comprising: visible light, ultraviolet light, infrared light, or a combination thereof. In another embodiment of the above method, the optical generator is a laser. In still another embodiment of the above method, the object is selected from the group comprising: a robotic arm, a part in a manufacturing environment, an object whose position and orientation is desired, or a combination thereof. In yet another embodiment of the above method, the diffractive element generates an optical pattern comprising a plurality of dots. In still another embodiment of the above method, the optical pattern is comprised of 4 or more dots. In yet another embodiment of the above method, 3 or more digital cameras are used to simultaneously capture digital images of the optical pattern and the digital cameras possess a pixel count of at least 3 million. In another embodiment of the above method, the minimization algorithm is a chi-square minimization algorithm operating in a MATLAB environment. The above method may also include any of the above embodiments described within the above system for determining the position and location of a module.

The method above may further comprise the step of attaching one or more additional modules onto the same object or a second object; the additional module includes an additional optical generator which generates an additional optical beam and an additional diffractive element placed in the path of the additional optical beam which generates an additional optical pattern; activating the additional module and generating an additional optical pattern on one or more surfaces; generating one or more digital images of the additional optical pattern with a plurality of digital cameras connected to a computer having photogrammetry software and a minimization algorithm installed on the computer; the digital cameras being set up in different locations to take one or more digital images of the additional optical pattern, with at least one digital image including the reference length artifact; downloading the digital images onto the computer; processing the digital images with the photogrammetry software to generate optical coordinate data; and inserting the optical coordinate data into the minimization algorithm to generate the position and location of the additional module. The additional optical generator(s) may emit a different type of optic beam (visual, infrared, ultraviolet) or a different color of optic beam to allow for the tracking of multiple modules and/or objects. The additional optical generator(s) may project a different kind of pattern to allow for the tracking of multiple modules and/or objects.

The present invention also includes another method for determining the position and location of a module comprising the following steps: attaching a module to an object, the module includes an optical generator which is a laser which generates an optical beam which is a laser beam followed by providing a diffractive element placed in the path of the optical beam which generates optical pattern beams and an optical pattern on one or more surfaces, the optical pattern being comprised of 4 or more dots. A reference length artifact is placed in a location with close proximity of the optical pattern. The module is then activated in order to generate an optical pattern on one or more surfaces followed by the generation of one or more digital images of the optical pattern with a plurality of digital cameras connected to a computer having photogrammetry software and a minimization algorithm installed on the computer. The minimization algorithm is a chi-square minimization algorithm operating in a MATLAB environment and the digital cameras are set up in different locations to take one or more digital image of the optical pattern simultaneously, with at least one image including the reference length artifact. The digital images are then downloaded onto the computer where they are processed with the photogrammetry software to generate optical coordinate data. The optical coordinate data is then inserted into the minimization algorithm to generate the position and location of the module.

In one embodiment of the above method the object is selected from the group comprising: a robotic arm, a part in a manufacturing environment, an object whose position and orientation is desired, or a combination thereof. In another embodiment of the above method, 3 or more digital cameras are used to simultaneously capture digital images of the optical pattern and wherein the digital cameras possess a pixel count of at least 3 million.

The present invention also includes another method for determining the position and location of a module 10 comprising the steps of: attaching a module 10 to an object 40, said module 10 includes an optical generator 12 which generates an optical beam 14 and a diffractive element 20 placed in the path of the optical beam 14 which generates optical pattern beams 25 and an optical pattern 30; placing a reference length artifact 50 in a location with close proximity to the optical pattern 30; activating the module 10 and generating an optical pattern 30 on one or more surfaces; generating one or more digital images 65 of the optical pattern 30 with a plurality of digital cameras 60 connected to a computer 70 having photogrammetry software and a minimization algorithm installed on the computer 70; the digital cameras 60 being set up in different locations to take one or more digital image 65 of the optical pattern 30, with at least one digital image including the reference length artifact; generating a virtual digital image from the module 10 wherein the module is also a virtual digital camera having a principal point which coincides with the point where the optical pattern beams 25 leave the diffractive element 20; simulating the virtual digital image for the virtual digital camera by extrapolating the optical pattern beams 25 back through the principal point (diffractive element 20) to a detector plane; downloading the digital images 65 and the simulated digital image onto the computer 70; and processing the digital images 65 and the simulated digital image with the photogrammetry software to generate optical coordinate data as well as the locations and orientations of each digital camera 60 and virtual digital camera (module 10) used in the system.

In one embodiment of the above method, one digital camera 60 and one virtual digital camera are used to provide digital images 65 and virtual digital images which are downloaded onto a computer 70 and processed by the photogrammetry software to generate optical coordinate data as well as the locations and orientations of each digital camera 60 and virtual digital camera (module 10) used in the system. In another embodiment of the above method, two or more digital cameras 60 and one or more virtual digital cameras are used to provide digital images 65 and virtual digital images which are downloaded onto a computer 70 and processed by the photogrammetry software to generate optical coordinate data as well as the locations and orientations of each digital camera 60 and virtual digital camera (module 10) used in the system.

The present invention also includes a process for ultra precision, multi-axis diamond machining. Ultra precision, multi-axis diamond machining can be used to manufacture optical quality free-form components. Thermal environmental changes while machining a part, especially large parts several meters in size, can lead to significant form deformations. Final inspection is not typically completed while the part is on the machine; rather the part is measured externally with a coordinate measuring machine (CMM), an optical scanner, or an interferometer. Contact measurements can compromise the surface quality, interferometry is best suited to nearly flat or spherical components, and common optical scanning techniques often do not meet desired measurement uncertainties. Further, removing the part for the measurement breaks the connection between the part and machine-tool coordinate systems and re-machining is difficult. Currently, the limiting factor in part manufacturing is the precision metrology used to assess surface form errors. However, if measurements of the form could be performed in-situ, while the part is being machined, then better parts could be manufactured where inaccuracies in the surface form caused by the machine tool can be corrected. In the present invention, we describe a new measurement that combines photogrammetry and optical scattering, with specular reflection of a laser beam from the part. A laser beam is directed toward the surface and reflected from the surface to be measured, passing through two tinted windows. Photogrammetry is used to determine the coordinates of the beam locations relative to the reference length and defined origin at the two windows, which is then used to define the incident and reflected beam orientations. The intersection of these beams is the coordinate of the reflection point on the surface. The beam must be scanned over the surface to build up/map out the surface profile. Alternatively vector calculus can be applied to determine the surface normal, and finally the profile is extracted via integration. For this metrology technique, we suggest that uncertainties in the angle of the incident beam with respect to the surface normal, directly correlate to the uncertainties in the localized slope, or sagitta deviation at a particular point. Simulating random Gaussian noise in the slope, or incident angle, it can be expected that at uncertainty levels of 2:10000 and 3:100000 lead to an overall sagitta deviation error of approximately 200 nm and 10 nm, respectively, for a simple parabolic form. The proposed approach is low-cost, non-contact, in situ, and can measure arbitrary free-form surfaces.

In one embodiment of the present invention, a laser beam is directed toward the surface and reflected from the surface to be measured, passing through one or more tinted windows. Photogrammetry is used to determine the coordinates of the beam locations relative to the reference length and defined origin where the beam passes through the window or windows, which is then used to define the incident and reflected beam orientations. The intersection of these beams is the coordinate of the reflection point on the surface. In another embodiment, a diffractive element is placed in the path of the laser beam causing a plurality of optical pattern beams to be directed toward the surface and reflected from the surface to be measured, passing through one or more tinted window thereby minimizing the scanning required to build up a full measurement of the surface. Photogrammetry is used to determine the coordinates of the beam locations relative to the reference length and defined origin where the beams pass through the window or windows, which is then used to define the incident and reflected beam orientations. The intersection of these beams is the coordinate of the reflection point on the surface.

EXAMPLES

Example 1

2.1 Principle

The optical pattern used in Example 1 is a 7×7 dot matrix (optical pattern) generated by a commercial-purchased projection head from Edmund Optics Inc. The angle between adjacent optical beams (seen as dots on the wall) is specified by the manufacturer as 1.9°. The method is to perform photogrammetry on the dot matrix (optical pattern) observable on the wall and use an existing commercial photogrammetry software package PhotoModeler® to determine the absolute coordinates, $P_i$ ($x_i$, $y_i$, $z_i$), of each dot in a defined coordinate system. Taking the coordinates of the module in the coordinate system to be M ($x_m$, $y_m$, $z_m$), then the measured angle between adjacent optical pattern beams and the angle between diagonal adjacent optical pattern beams can be calculated by performing dot products between vectors ($\overrightarrow{MP_i}$) that dot from the module location to a dot location on the wall. The expressions are given, for example, by:

$$\theta_{VH} = \cos^{-1}\left(\frac{\overrightarrow{MP_1} \cdot \overrightarrow{MP_2}}{|\overrightarrow{MP_1}| \cdot |\overrightarrow{MP_2}|}\right), \quad (1)$$

$$\theta_{Diagonal} = \cos^{-1}\left(\frac{\overrightarrow{MP_1} \cdot \overrightarrow{MP_3}}{|\overrightarrow{MP_1}| \cdot |\overrightarrow{MP_3}|}\right). \quad (2)$$

Here $\theta_{VH}$ stands for the angle measured between adjacent dots in horizontal and vertical directions, and $\theta_{Diagonal}$ stands for the angle measured between adjacent dots in the diagonal direction. The symbols $\overrightarrow{MP_1}$, $\overrightarrow{MP_2}$, $\overrightarrow{MP_3}$ represent the three sample vectors shown in FIG. 3. They contain the unknown module position variables $x_m$, $y_m$, and $z_m$. For example, the vector from the module location to the center dot is given by $$\overrightarrow{MP_1} = (x_1 - x_m, y_1 - y_m, z_1 - z_m). \quad (3)$$

Figure 3:
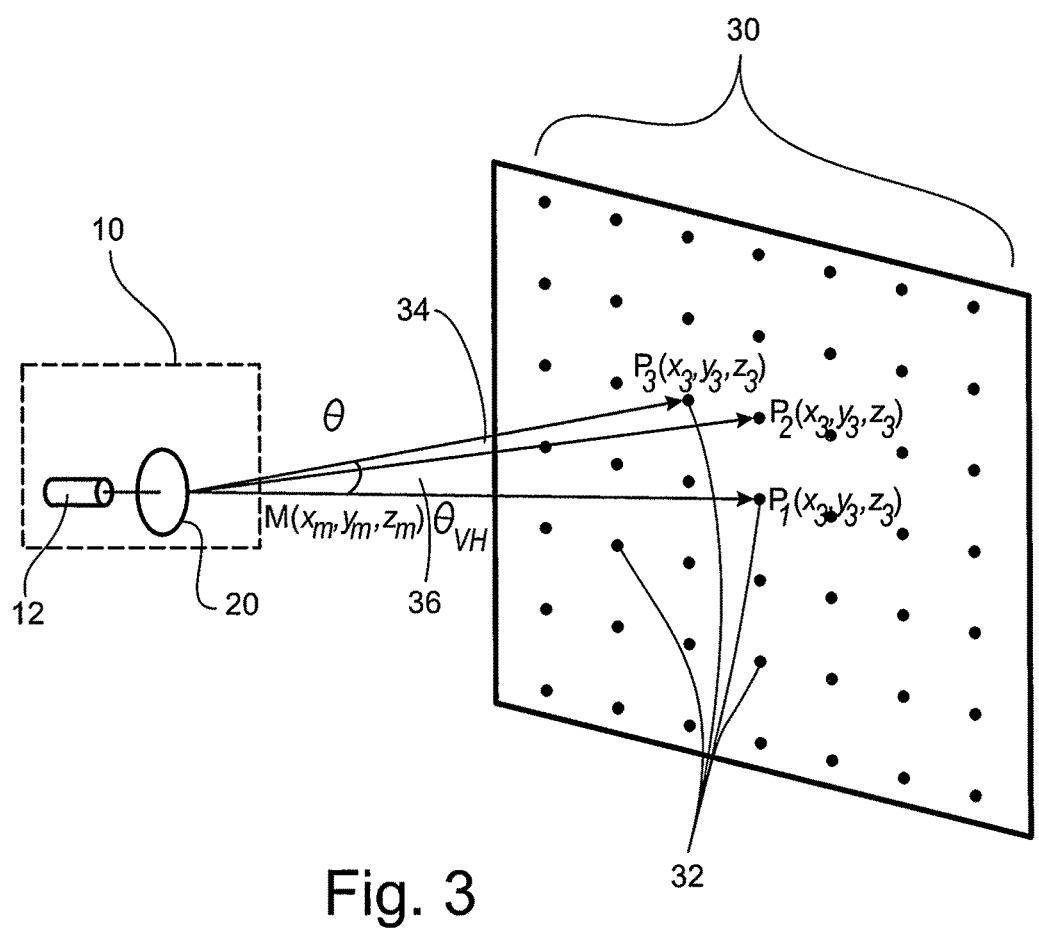
FIG. 3 illustrates one embodiment of a module generating an optical pattern on a wall according to the present invention.

For the optical pattern of the 7×7 dot matrix, there are a total of 84 angles of 1.9° between adjacent dots in the horizontal and vertical directions, and another 72 angles of 2.7° between adjacent dots in diagonal direction as shown in FIG. 3. The chi-square minimization method was used to determine the coordinates of the module. The full expression for chi-square is given by $$\chi^2 = \sum_{84}(1.9° - \theta_{VH})^2 + \sum_{72}(2.7° - \theta_{Diagonal})^2. \quad (4)$$

The data processing algorithm developed in MATLAB uses the Nelder-Mead simplex method (Nelder and Mead, 1965), which gives the coordinates of the module for which the Chi-squared value in equation (4) is minimized. The coordinates of the dots are computed by photogrammatic software program PhotoModeler® in a coordinate system based on the reference length placed on the wall.

Figure 4:
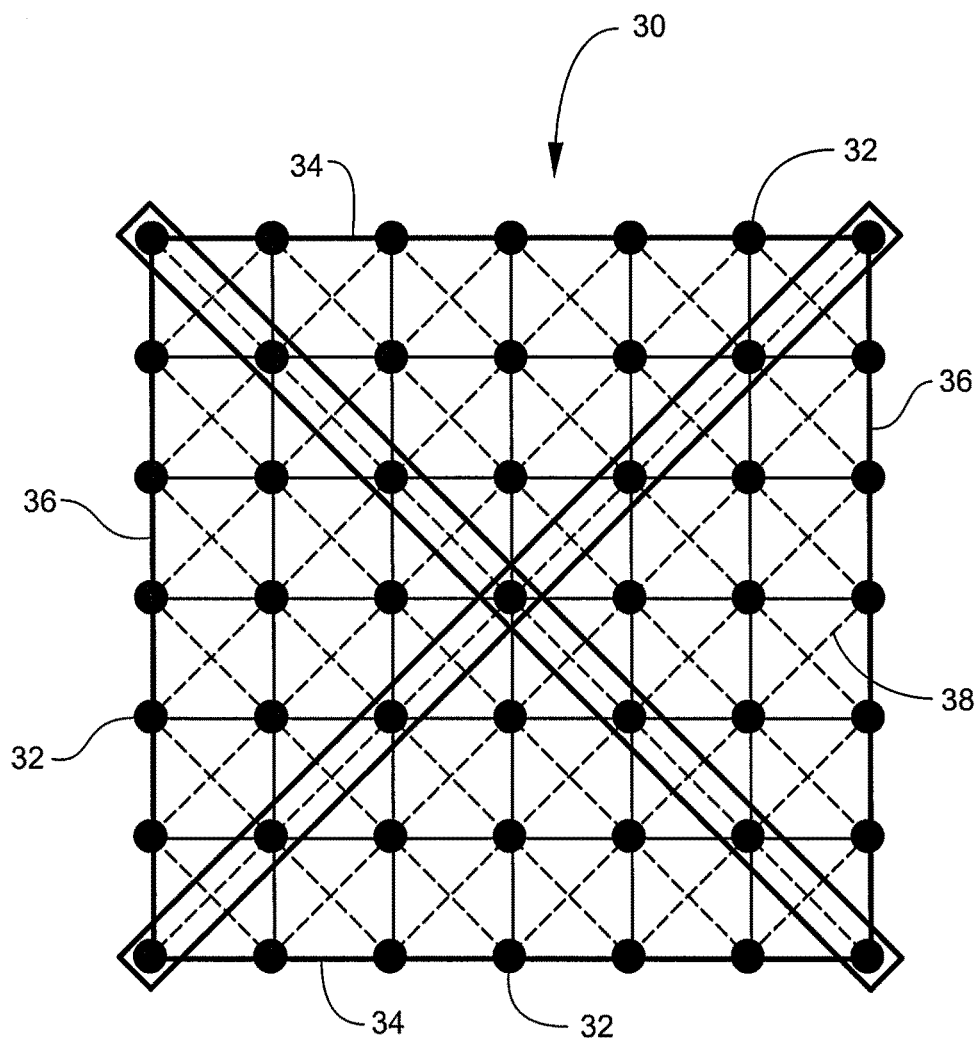
FIG. 4 illustrates one embodiment of an optical pattern according to the present invention.

For the initial experiments the dots used for the photogrammetry measurement were picked by hand, therefore only 13 of the possible 49 dots were used (see FIG. 4—the highlighted X). Thus, our chi-square minimization included a subset of the terms shown in equation (4).

2.2 Experimental Setup

The experimental setup is shown in FIG. 5. The module shown in FIG. 5 consists of a red laser and a projection head. The laser has a wavelength of 650 nm and a power of 40 mW. The projection head was made by Edmund Optics Inc., and generates a 7×7 dot matrix with full fan angle of 11.4°×11.4° (1.9°×1.9° between adjacent beams). The module is mounted on a THORLABS Inc. rotation stage. The rotation stage allows continuous 360° rotation with 2° scale increments and the angle position can be read with a resolution of approximately 0.2°. The rotation stage is mounted on a precision translation rail manufactured by TRIMOS Inc. of Switzerland. It has a resolution of 1 µm and translation range of 1 meter. We use three 9 megapixel Canon PowerShot SX110IS digital cameras to collect digital images for the photogrammetry. These are used to take digital images of the dot matrix pattern on the wall. They are connected to a computer through a USB hub and the computer uses a remote control software package (PSRemote Multi-Camera (Breeze Systems, 2009)) to control all three cameras at once. The cameras are triggered to all take a picture at the same time with a time delay of less than 50 milliseconds. A reference length artifact is attached to the wall to provide a known length and a global coordinate system (see inset in FIG. 5). The designated Y axis of the reference length artifact is defined to have a length of 254 mm. The function of the reference length artifact is to enable the actual size of the object under investigation to be determined. Digital images are fed into PhotoModeler®, which is commercial photogrammetry software developed by Eos System Inc. This software performs photogrammetry on the diffraction pattern and determines the x y z coordinates of the 13 diagonal dots. These coordinates are sent to the minimization algorithm implemented in MATLAB. The algorithm carries out the chi-square minimization (equation (4)) and returns the coordinates, $x_m$, $y_m$, $z_m$, of the module in the global coordinate system defined by the reference length on the wall. The module angle is determined by calculating the angle of the vector $\overrightarrow{MP_1}$.

2.3 Procedure

The module starts at position 1 and the laser is turned on, generating the diffracted 7×7 dot matrix pattern (optical pattern) observable on the wall.

1. Three digital images of the dot matrix (optical pattern) are simultaneously taken by the three high resolution Canon cameras from different positions.
2. The three digital images are opened in PhotoModeler®. The thirteen diagonal dots (shown in FIG. 4) as well as the reference length artifact points are marked with PhotoModeler®. Next, the bundle adjustment is performed by PhotoModeler® to yield the optical coordinate data of the thirteen dots.
3. The optical coordinate data of the thirteen dots are imported into MATLAB and used by the chi-square minimization algorithm to determine the $x_m$, $y_m$, and $z_m$ coordinates of the module (FIG. 3). The module is then moved to position 2 and the steps are repeated. For each subsequent position, the translation distance and the rotation angle of the module is determined. We arbitrarily define the first measurement position as distance zero.

The distance translated by the module is calculated using the coordinates of the module ($x_m$, $y_m$, $z_m$) between adjacent positions. In the rotation test, the rotated angle is calculated based on the angle change of the $\overrightarrow{MP_1}$ vector at two positions (see FIG. 3). Rotation measurement results can be further improved by using all 13 vectors to determine an average rotation angle, thus reducing random measurement noise.

3. Results and Discussion 3.1 Uncertainty of Photogrammetry Measurement

Because photogrammetry is a crucial part of this technique, the repeatability of photogrammetry measurement our lab conditions was investigated. In this part, steps one through four of the above procedure were done. Three photos of the scattered dot matrix were taken by three cameras at different position with different angles. Three photos were loaded into PhotoModeler® to build a 3-D model of the scattered pattern. Thirteen diagonal dots were picked for the initial tests, see FIG. 4. The coordinates of each dot can be determined after defining the reference length and coordinate system, as mentioned before. The same three photos were used to repeat this process 10 times so the repeatability of the photogrammetry measurement can be studied. For the coordinate of the central dot, the standard deviations in x, y, and z directions are 0.04 mm, 0.04 mm, and 0.05 mm respectively based on 10 repeated measurements. These values are small compared to the module coordinate repeatabilities observed for our final measurement results.

3.2 Translation Test

Figure 14:
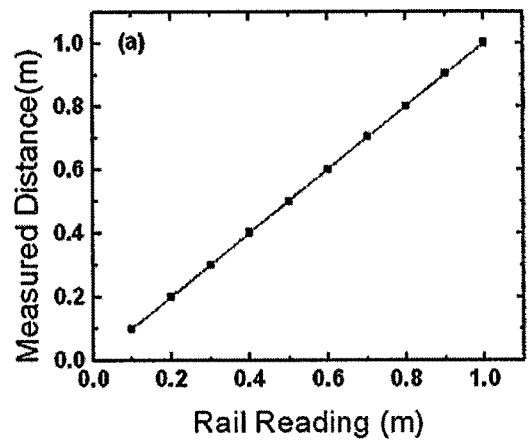
FIG. 14 illustrates the results of a translation test.

The module was translated 1 meter along the precision rail at 0.1 m intervals. At each position, three photos of the dot matrix (optical pattern) were taken to determine the location of the module. The coordinates of the module at each position were calculated using the minimization algorithm. From the position data, the distance the module moved was calculated. The translation test was done three times and the average measured distance at each position versus the rail reading is shown in FIG. 14. The linear fit equation is $Y=1.005 \times X + 0.001$ with $R^2=1$, which indicates that measurement distances fit well with rail reading.

3.3 Rotation Test

Figure 15:
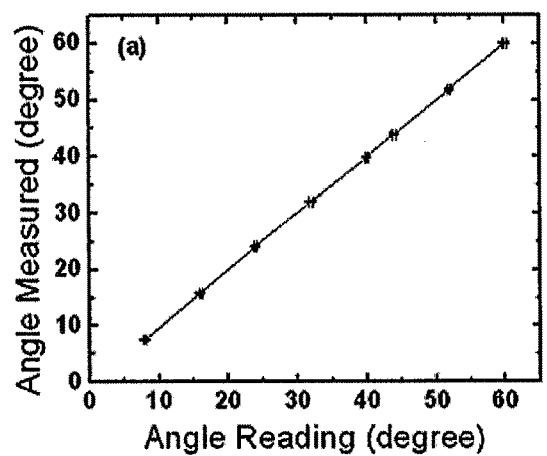
FIG. 15 illustrates the average values of measured angles from a rotation test.

The module was rotated through a range of 60° for the rotation test. The test was repeated three times. The average values of measured angles based on three measurements versus angle reading are shown in FIG. 15.

The minimum increment scale of the rotation table is 2° and our uncertainty in reading the scale is approximately 0.2°. In FIG. 15, the error bar of the horizontal axis represents the ±uncertainty of the angle reading with values of ±0.2°, and the error bar of the vertical axis represents the ±measurement standard deviation at each position. As shown in FIG. 15, the measured angles fit quite well with angle readings.

Example 2

Figure 9:
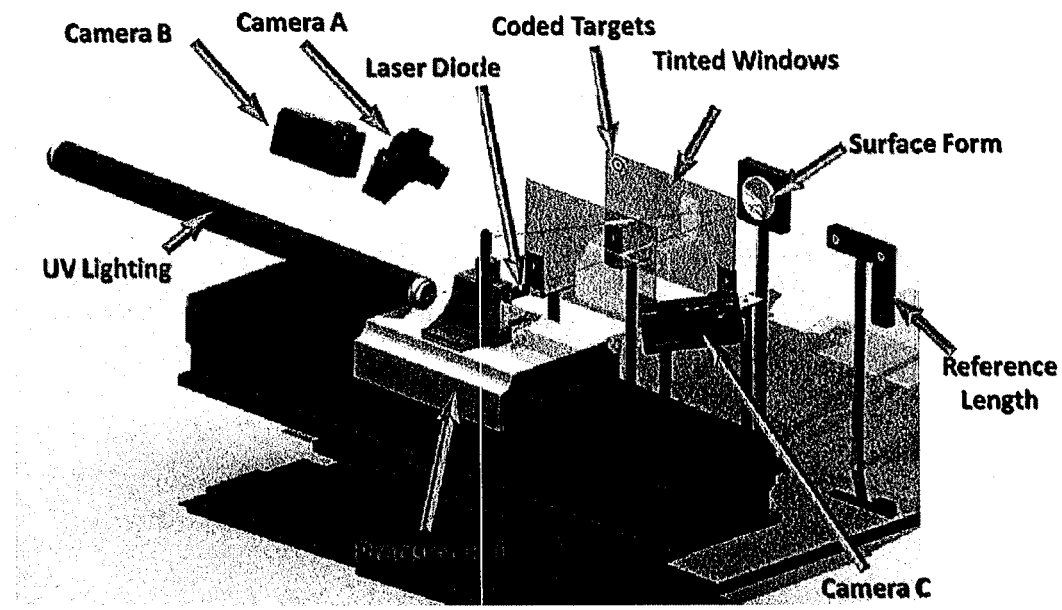
FIG. 9 illustrates an in-situ measurement setup for preliminary testing.

The setup is illustrated in FIG. 9. A 40 mW red laser diode (λ=650 nm) is mounted to a 12 mm translation stage micrometer such that the laser can be aligned along the Y-axis. The translation stage is mounted to a precision rail manufactured by TRIMOS Inc. of Switzerland. The precision rail has a resolution of 1 µm and a translation range of approximately 1 meter. The laser is directed toward the surface form to be measured. Between the surface form and laser are two semi-transparent windows. The windows are 127 mm×203 mm×2.286 mm. They were manufactured from polycarbonate and made semi-transparent by lightly polishing the surface with a #600 grit sanding film on both sides. As a single beam is emitted from the laser diode, it passes through the semi-transparent windows where a footprint or spot is visible from the light diffusely scattering off each window. The beam is reflected off the specular surface being measured back through the same windows.

The setup also includes three Canon PowerShot SX110IS digital cameras arranged around the windows. The 9.0 megapixel resolution cameras are used to capture images of the four scattered spots on the two windows caused by the incident and reflected beams. The cameras are connected to a computer via a USB hub and can be programmed through a software package (PSRemote Multi-camera by Breeze Systems) to simultaneously take images.

Figure 10:
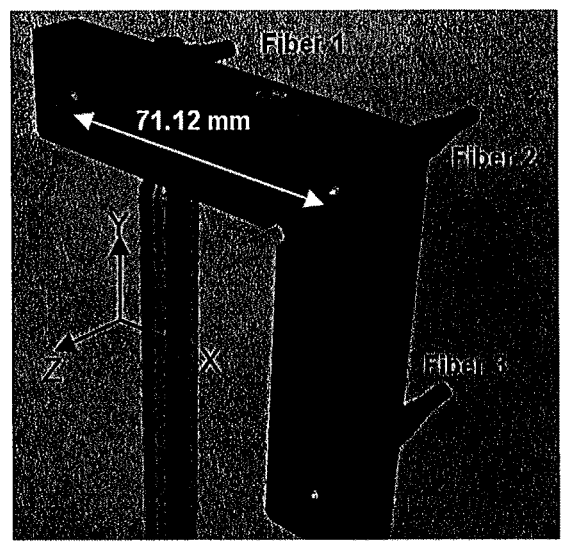
FIG. 10 illustrates a reference length artifact utilizing three 200 μm multimode fibers and a blue LED source.

An illuminated reference length (FIG. 10) was fabricated, because the beam scattered spots are best seen in low room lighting conditions. The reference length is three 200 µm multimode fibers housed in an aluminum fixture. The dimensions of the frame as measured by a coordinate measuring machine (CMM) are 96.5 mm×96.5 mm×12.7 mm. The fibers connect to the body of the reference length and are arranged in an L-shape to provide a coordinate system. The opposite ends of the multimode fibers connect to a light source box (not shown) with three high intensity light-emitting diodes (LED). The LEDs are regulated by a potentiometer to enable optimum brightness control.

Figure 11A:
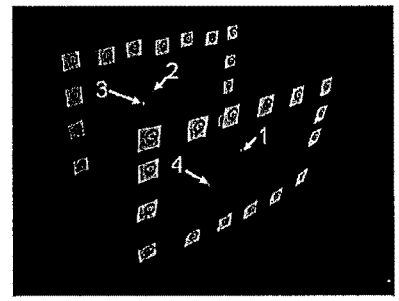
FIG. 11 illustrates point referencing.
Figure 11B:
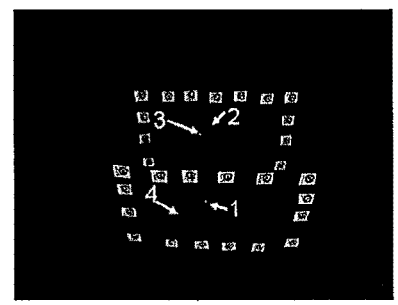
Figure 11C:
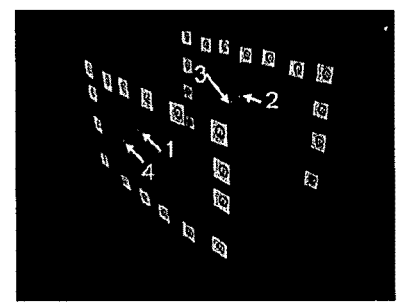

Fluorescent coded targets are fixed to the semi-transparent windows. These targets are automatically identified and referenced to each other in multiple images by the photogrammetry software package (Photomodeler™ by Eos systems). Coded targets are used to initiate the automated process explained below. Once the locations of the coded targets are found, the estimated coordinates of all other spots generated on the window and from the reference length can be found and reference accordingly. FIG. 11 illustrates how points are referenced. Point 1 from image 1 (FIG. 11(a)) is referenced to point 1 on image 2 (FIG. 11(b)) to and point 1 on image 3 (FIG. 11(c)). The common points in the overlapping images are identified and the bundle adjustment process is performed where the xyz coordinates of each spot are calculated. The coordinates of these points are sent to an algorithm implemented in MATLAB™. The algorithm, described later under Results and Discussion, then calculates the slope profile at each point to estimate the overall surface profile.

Slope Profile Algorithm

The xyz coordinates of the spots on the windows are obtained from the photogrammetry process. Two vectors, $v_i$ and $v_r$, are obtained from the coordinates of the spots where $v_i$ represents the incident beam and $v_r$ represents the reflected beam. The angle between the two vectors is calculated from the dot product:

$$\theta = \cos^{-1}\left(\frac{v_i \cdot v_r}{|v_i||v_r|}\right).$$

Also the coordinates of a vector, $\hat{z}'$, orthogonal to these two vectors, is calculated from the cross product:

$$\hat{z}' = (v_i \times v_r).$$

Figure 12:
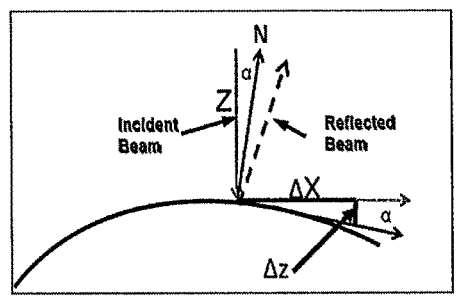
FIG. 12 illustrates slope profile calculation.

From the law of reflection we know that the angle of incidence, with respect to the vector normal to the surface, is equal to the angle of reflection. Therefore the angle of incidence, $\theta_i$, is half of the angle between the two vectors, $\theta$. The vector for the reflected beam is then rotated about the orthogonal vector, $\hat{z}'$, to give the vector normal to the surface, $\hat{N}$. Projecting the normal vector onto a 2D plane (X-Z), the angle the reflected beam makes with the Z-axis, $\alpha$, can be calculated (FIG. 12). This gives the incremental surface slopes along the X-axis. Noting the incremental distance traveled in the X-direction (as determined by the encoder on the precision rail), the sag ($\Delta z$) for the particular point on a surface can be estimated as:

$$\Delta z = \Delta x \tan \alpha.$$

Subsequently, the sag at each point can be summed to obtain an estimate of the total sag, or profile, of the part being measured. This obviously improves with reduced step size.

Test Details

Three different mirrors were investigated to obtain a figure profile (see Table 1). The profile obtained is the result of rastering the laser across the center of the mirror once. The basic measurement steps involved were 1) align the laser with the mirror center, 2) start the measurement with the laser beam positioned at the edge of the mirror, 3) an image from three camera vantage points are taken of the four spots visible on the windows, 4) translate the laser along the X-axis in increments of 2 mm and capture another set of three images, 5) repeat until the laser has covered the full diameter of the mirror, 6) process the images in MATLAB™ and PhotoModeler™ to extract the xyz coordinates of each of the four laser induced spots, 7) process coordinates in an algorithm to determine the mirror sag or profile along the desired path.

Results and Discussion

Figure 13:
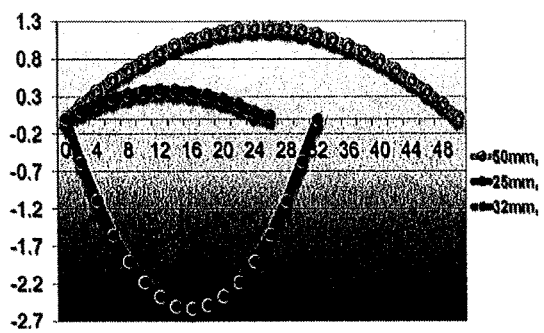
FIG. 13 illustrates the preliminary measurement results for a 50 mm convex, 25 mm convex and 32 mm concave mirror.

Measurements of three separate spherical mirrors distributed by Edmund Optics Inc. were taken using the system described. Table 1 shows the aperture size of the mirror, the radius of curvature and sag as indicated by the manufacturer, and the preliminary measurement results. Each measurement was taken at increments $\Delta x=2$ mm. FIG. 13 shows the results of the profiles. The preliminary test results correlate well to the manufacturer's specifications. It should be noted that profiles with a small radius of curvature, such as the 32 mm concave mirror, would significantly benefit from measurements with smaller step increments.

TABLE 1

Preliminary measurement results for a 50 mm convex, 25 mm convex, and 32 mm concave mirror.

| Aperture (mm) | Manufacturer Specification | | Preliminary Results | |
|---|---|---|---|---|
| | R (mm) | Sag (mm) | R (mm) | Sag (mm) |
| 25 | 209 | 0.37 | 204.173 | 0.383 |
| 32 | 50 | 2.63 | 51.819 | 2.532 |
| 50 | 258 | 1.21 | 258.232 | 1.213 |

Automation

Automation is accomplished in MATLAB™ using dynamic data exchange (DDE). With DDE, MATLAB™ can be used as a client application to initiate and maintain conversations with server applications, such as Photomodeler™ and PSRemote. During the initial testing each point had to be manually marked. Though Photomodeler™ has the capabilities to automatically mark targets, it will often mark false, or unwanted, targets created by hot spots or secondary reflections. MATLAB™ is now used to perform some initial image processing to filter out false targets.

The MATLAB™ image processing program is first used to control PSRemote. This gathers the photographs needed from the measurement system. The images are then sent to Photomodeler™ where the photogrammetry process takes place. Here Photomodeler™ is directed to import the desired images, automatically mark the coded targets and orient the cameras. The 7 dot targets, four from the windows and three from the reference length, are identified (marked) using filtering techniques in MATLAB™. This helps alleviate the automatic marking of false targets in Photomodeler™. The pixel coordinates for the dot targets, as obtained by MATLAB™, are used to mark the images in Photomodeler™. Once all images have been marked, Photomodeler™ is directed to automatically reference each correlating point in the images (FIG. 11) to calculate the xyz of the generated spots. These xyz coordinates are then sent to the profile generation algorithm in MATLAB™ to calculate the sag or form of the object being measured.

The invention claimed is:

1. A system for determining the position and location of a module comprising:
   a module which has a position and a location and includes:
      an optical generator which generates an optical beam; and
      a diffractive element placed in the path of said optical beam which generates an optical pattern which is projected on one or more surfaces which do not include said module;
   a reference length artifact placed in a location with close proximity to said optical pattern; and
   a plurality of digital cameras connected to a computer with photogrammetry software and a minimization algorithm installed on said computer;
      said digital cameras being set up in different locations to take one or more digital image of said optical pattern, with at least one image including said reference length artifact;
      where said digital images are downloaded onto said computer and processed by said photogrammetry software to generate optical coordinate data followed by the insertion of said optical coordinate data into the minimization algorithm to generate the position and location of said module.

2. The system of claim 1 wherein said optical generator is capable of generating light selected from the group comprising: visible light, ultraviolet light, infrared light, or a combination thereof.

3. The system of claim 2 wherein said optical generator being a laser.

4. The system of claim 1 wherein said diffractive element generates an optical pattern comprising a plurality of dots.

5. The system of claim 4 wherein said optical pattern is comprised of 4 or more dots.

6. The system of claim 1 wherein 3 or more digital cameras are used to simultaneously capture digital images of said optical pattern and wherein said digital cameras possess a pixel count of at least 3 million.

7. The system of claim 1 wherein said minimization algorithm is a chi-square minimization algorithm operating in a MATLAB environment.

8. The system of claim 1 further including one or more additional modules which include an additional optical generator which generates an additional optical beam and an additional diffractive element placed in the path of said additional optical beam which generates an additional optical pattern.

9. A method for determining the position and location of a module comprising the steps of:
   attaching a module to an object, said module having a position and a location and includes:
      an optical generator which generates an optical beam; and
      a diffractive element placed in the path of said optical beam which generates optical pattern beams and an optical pattern on one or more surfaces which does not include said module;
   placing a reference length artifact in a location with close proximity of said optical pattern;
   activating said module and generating an optical pattern on one or more surfaces;
   generating one or more digital images of said optical pattern with a plurality of digital cameras connected to a computer having photogrammetry software and a minimization algorithm installed on said computer;
      said digital cameras being set up in different locations to take one or more digital image of said optical pattern, with at least one digital image including said reference length artifact;
   downloading said digital images onto said computer;
   processing said digital images with said photogrammetry software to generate optical coordinate data; and
   inserting said optical coordinate data into said minimization algorithm to generate the position and location of said module.

10. The method of claim 9 wherein said optical generator is capable of generating light selected from the group comprising: visible light, ultraviolet light, infrared light, or a combination thereof.

11. The method of claim 10 wherein said optical generator being a laser.

12. The method of claim 9 wherein said object is selected from the group comprising: a robotic arm, a part in a manufacturing environment, an object whose position and orientation is desired, or a combination thereof.

13. The method of claim 9 wherein said diffractive element generates an optical pattern comprising a plurality of dots.

14. The method of claim 13 wherein said optical pattern is comprised of 4 or more dots.

15. The method of claim 9 wherein 3 or more digital cameras are used to simultaneously capture digital images of said optical pattern and wherein said digital cameras possess a pixel count of at least 3 million.

16. The method of claim 9 wherein said minimization algorithm is a chi-square minimization algorithm operating in a MATLAB environment.

17. The method of claim 9 further comprising the step of attaching one or more additional modules onto the same object or a second object; said additional module includes an additional optical generator which generates an additional optical beam and an additional diffractive element placed in the path of said additional optical beam which generates an additional optical pattern;
   activating said additional module and generating an additional optical pattern on one or more surfaces;
   generating one or more digital images of said additional optical pattern with a plurality of digital cameras connected to a computer having photogrammetry software and a minimization algorithm installed on said computer;
      said digital cameras being set up in different locations to take one or more digital image of said additional optical pattern, with at least one digital image including said reference length artifact;
   downloading said digital images onto said computer;
   processing said digital images with said photogrammetry software to generate optical coordinate data; and
   inserting said optical coordinate data into said minimization algorithm to generate the position and location of said additional module.

18. A method for determining the position and location of a module comprising the steps of:
   attaching a module to an object, said module having a position and a location and includes:
      an optical generator which generates an optical beam, said optical generator being a laser and said optical beam being a laser beam; and
      a diffractive element placed in the path of said optical beam which generates optical pattern beams and an optical pattern on one or more surfaces which does not include said module, said optical pattern being comprised of 4 or more dots;

placing a reference length artifact in a location with close proximity of said optical pattern;

activating said module and generating an optical pattern on one or more surfaces;

generating one or more digital images of said optical pattern with a plurality of digital cameras connected to a computer having photogrammetry software and a minimization algorithm installed on said computer, said minimization algorithm being a chi-square minimization algorithm operating in a MATLAB environment;

said digital cameras being set up in different locations to take one or more digital image of said optical pattern simultaneously, with at least one image including said reference length artifact;

downloading said digital images onto said computer;

processing said digital images with said photogrammetry software to generate optical coordinate data; and inserting said optical coordinate data into said minimization algorithm to generate the position and location of said module.

19. The method of claim 18 wherein said object is selected from the group comprising: a robotic arm, a part in a manufacturing environment, an object whose position and orientation is desired, or a combination thereof.

20. The method of claim 18 wherein 3 or more digital cameras are used to simultaneously capture digital images of said optical pattern and wherein said digital cameras possess a pixel count of at least 3 million.

* * * * *